United States Patent [19]

Wortman et al.

[11] Patent Number: 4,829,527

[45] Date of Patent: May 9, 1989

[54] WIDEBAND ELECTRONIC FREQUENCY TUNING FOR OROTRONS

[75] Inventors: Donald E. Wortman, Rockville; Herbert Dropkin, Washington; Richard P. Leavitt, Berwyn Heights, all of Md.

[73] Assignee: The United States of America as represented by the Secretary of the Army, Washington, D.C.

[21] Appl. No.: 603,251

[22] Filed: Apr. 23, 1984

[51] Int. Cl.[4] .................................................. H01S 3/00

[52] U.S. Cl. ............................................ 372/2; 372/9; 372/15; 372/20; 372/108; 372/99; 372/102; 315/3.6; 315/3; 315/4; 315/5

[58] Field of Search ........................ 372/2, 102, 20, 32, 372/98, 99, 107, 108, 9, 14, 15; 315/3.6, 3, 4, 5; 331/79

[56] References Cited

U.S. PATENT DOCUMENTS 4,286,230 8/1981 Morrison et al. ..................... 331/79

OTHER PUBLICATIONS

Leavitt et al.; "Millimeter-Wave Orotron Oscillatron-Part 1: Theory" *IEEE JQE*, vol. 17, No. 8, Aug. 1981.

Wortman et al., "Millimeter-Wave Orotron Oscillation-Part II; Experiment". *IEEE JQE*, vol. 17, No. 8, Aug. 1981.

Resin et al. "Orotron-An Electronic Oscillator with an Open Resonator and Reflecting Orating", *Pro. IEEE*, Apr. 69.

*Primary Examiner*—Leon Scott, Jr.

*Attorney, Agent, or Firm*—Saul Elbaum; Thomas E. McDonald

[57] ABSTRACT

An orotron for generating near millimeter wavelength radiation at a selectable output frequency within a wide frequency range, in which the orotron output power is automatically tuned electronically at the selected output frequency. A piezoelectric electromechanical positioning device is connected between the two mirrors forming the open resonator of the orotron to determine the mirror separation in accordance with a position control signal. The electron beam acceleration voltage, which determines the orotron output frequency, and the position control signal are adjusted simultaneously so as to tune the output power at a single oscillation mode of the orotron resonator over a wide frequency range. In the preferred embodiment, the actual output frequency is detected and compared with the selected output frequency, and the beam acceleration voltage and mirror separation simultaneously adjusted to continuously tune and maintain the orotron output at the selected frequency.

3 Claims, 2 Drawing Sheets

WIDEBAND ELECTRONIC FREQUENCY TUNING FOR OROTRONS

RIGHTS OF THE GOVERNMENT

The invention described herein may be manufactured, used, and licensed by or for the United States Government for Governmental purposes without payment to us of any royalty thereon.

BACKGROUND OF THE INVENTION

The invention relates generally to Smith-Purcell free-electron lasers, such as orotrons, ledatrons, and diffraction radiation generators. More Particularly, the invention relates to apparatus for electronically tuning orotrons and orotron-type devices over a wide frequency band.

In an orotron or similar device, a ribbon-like electron beam is directed over the surface of a reflecting diffraction grating and radiates into a mode of an open resonator formed by two mirrors, one of which is partially covered by the diffraction grating. The radiation generated by the beam-grating interaction (the so called Smith-Purcell effect) is fed back into the beam and bunches the electrons. If the proper conditions of synchronism between the electron velocity and the phase velocity of an evanescent wave travelling along the grating are met, coherent radiation results. The electron velocity is controlled by the cathode-to-grating voltage, and the mirror separation determines what type of RF mode can be set up to resonate in the open resonator form by the two mirrors.

Various orotrons and orotron-like devices, such as the 50-to-75 GHz orotron developed at the Harry Diamond Laboratories (HDL), Adelphi, MD, are tunable over a wide frequency range. However, in the past, the tuning of such orotrons was done by first changing the mirror separation mechanically and then adjusting the beam accelerating voltage (grating-to-cathode voltage), a tedious and relatively slow procedure.

OBJECTS IN SUMMARY OF THE INVENTION

Therefore, it is a primary object of the invention to provide an orotron or orotron-like device in which the output power can be rapidly and accurately tuned electronically over a wide frequency range.

It is another object of the invention to provide an orotron-like device in which the orotron output frequency can provide an orotron or orotron-like device in which the orotron output frequency can be rapidly selected and maintained during operation of the device, over a wide frequency range. It is a further object of the invention to provide rapid and automatic tuning of the orotron output power when the output frequency is changed.

In an orotron, the output frequency is a direct function of the grating-to-cathode voltage, whereas, for any particular resonator mode, the mirror separation required for maximum output power is a direct function of the output wavelength. Thus, as the grating-to-cathode voltage is increased to increase the output frequency of the orotron, the mirror separation must decreased to maintain maximum power output of the orotron.

In the invention described herein, a highly accurate, fast responding, electromechanical positioning device, such as a piezoelectric translator, is utilized to control the spacing between the two mirrors of the resonator in accordance with a control voltage supplied to it. As the grating-to-cathode voltage is changed to change the orotron output frequency, the control voltage to the mirror positioning device is simultaneously changed to maintain the orotron output at a maximum value over a wide frequency range. By so simultaneously adjusting the beam acceleration voltage and the mirror separation, a mode can be tracked rapidly over several GHz at nearly constant output power.

In a preferred embodiment of the invention, a feedback circuit is utilized to accurately determine and maintain the desired output frequency of the orotron. In this embodiment, the grating-to-cathode voltage and the control voltage to the mirror positioning device is simultaneously adjusted in accordance to the frequency difference between an actual measured frequency output of the orotron and a selected output frequency.

BRIEF DESCRIPTION OF THE DRAWINGS

The invention will be understood, and further objects, features and advantages thereof will become more apparent from the following description of the preferred embodiments, taken in conjunction with the accompanying drawings in which.

DESCRIPTION OF PREFERRED EMBODIMENT

Figure 1:
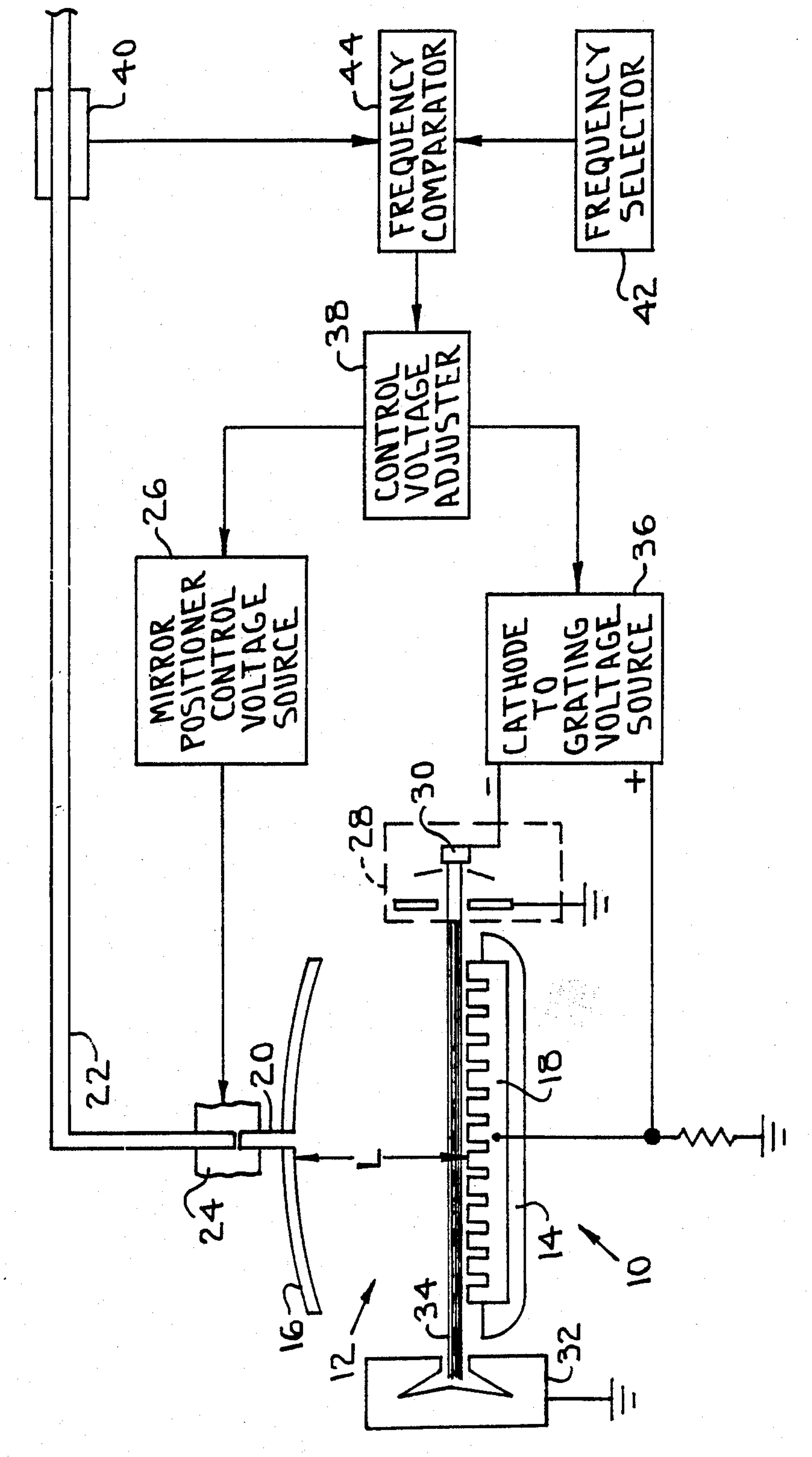
FIG. 1 is a schematic diagram of the preferred embodiment of the invention.

The orotron 10, shown diagrammatically in FIG. 1, includes an open resonator 12 formed by a fixed metallic lower mirror 14 and a moveable metallic upper mirror 16 which is spaced from the lower mirror 14 by a distance L. The lower mirror is partially covered by a metallic reflecting diffraction grating 18 embedded therein, and the upper 16 includes a centrally disposed output coupling 20. The output coupling 20 is connected to an output line or waveguide 22, and a piezoelectric electromechanical positioning device 24 moves the upper 16 in translation and determines the mirror separation L in accordance with a mirror position control voltage supplied to the positioner 24 by a mirror positioner control voltage source 26.

An electron gun 28, including a cathode 30, is disposed on one side of the open resonator 12, and an electron collector 32 is disposed on an opposite side of the resonator. During operation of the orotron, a ribbon-like electron beam 34 generated by the electron gun 28 is directed through the open resonator 12 across the diffraction grating 18 to the collector 32. Radiation generated by the interaction between the electron beam and the diffraction grating (the Smith-Purcell effect) is reflected back onto the beam in the open resonator, causing the electrons therein to bunch. When the proper conditions of synchronism between the electron beam velocity and the phase velocity of an evanescent wave traveling along the grating are met, coherent radiation results. The electron velocity is controlled by the cathode-to-grating voltage supplied by the cathode-to-grating voltage source 36, and the mirror separation L determines what type of RF mode can be set up to resonate the open resonator 12 formed by the upper and lower mirrors 14, 16.

Figure 2:
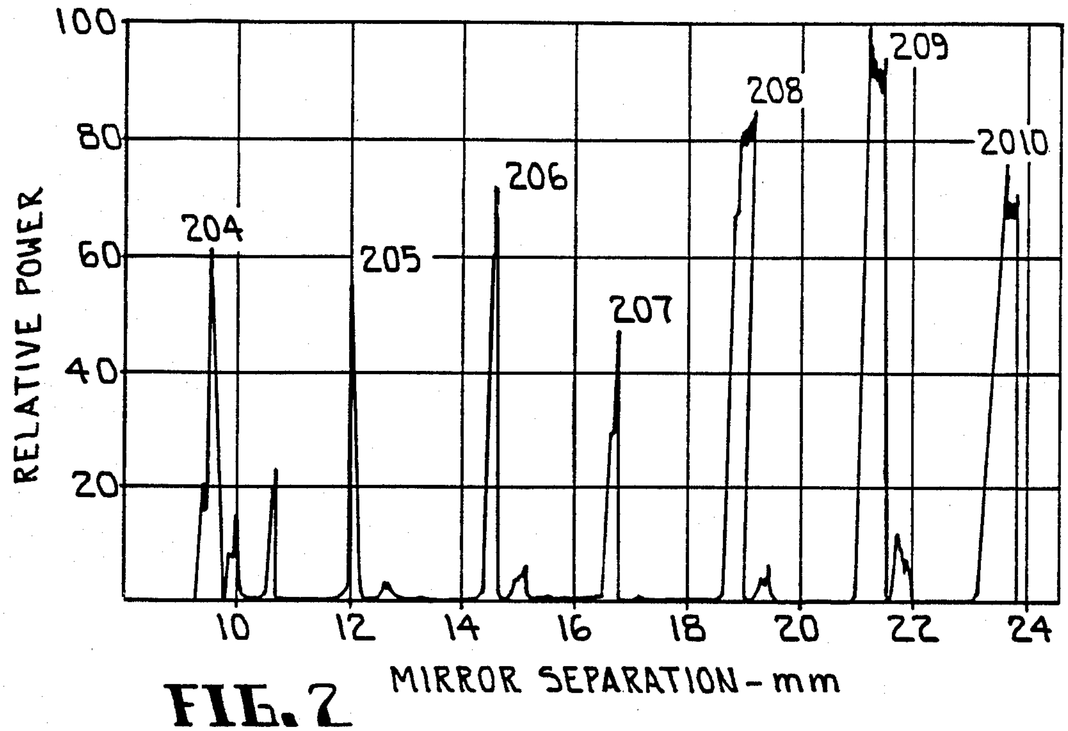
FIG. 2 is a diagram showing the variation of output power with mirror separation distance for a typical orotron.

When the electron beam 34 grazes the grating 18 at fixed grating-to-cathode voltage, oscillation can be achieved in several modes by varying the spacing L between the resonator mirrors 14, 16. For example, FIG. 2 shows the relative power output of the HDL 50-to-75 GHz orotron when the mirror spacing L is varied and a fixed grating-to-cathode voltage of 2412 volts is applied. As the mirror spacing is opened from 10 to 24 mm, the mode changes from $TEM_{204}$ to $TEM_{2010}$.

Figure 3:
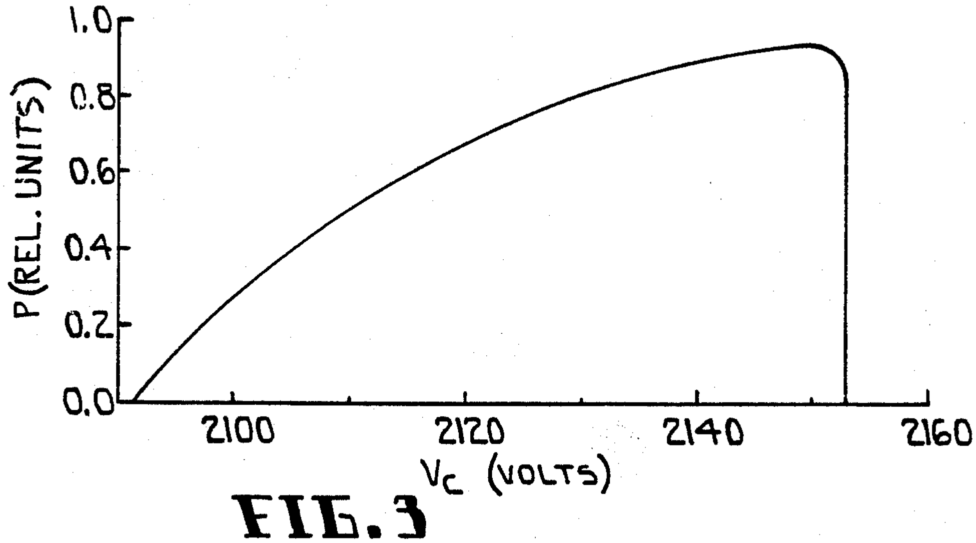
FIG. 3 is a diagram showing the power output of a single orotron mode versus the beam-accelerating voltage.

Also, the frequency of orotron oscillation can be varied over a limited frequency range at a single mode of the resonator solely by varying the beam acceleration voltage, even though the power output will vary considerably. For example, FIG. 3 shows the power profile of a single orotron mode ($TEM_{207}$) for the HDL 50-to-75 GHz orotron as the mirror separation L is held fixed, and the grating-to-cathode voltage is varied from about 2090 volts to 2160 volts.

Figure 4:
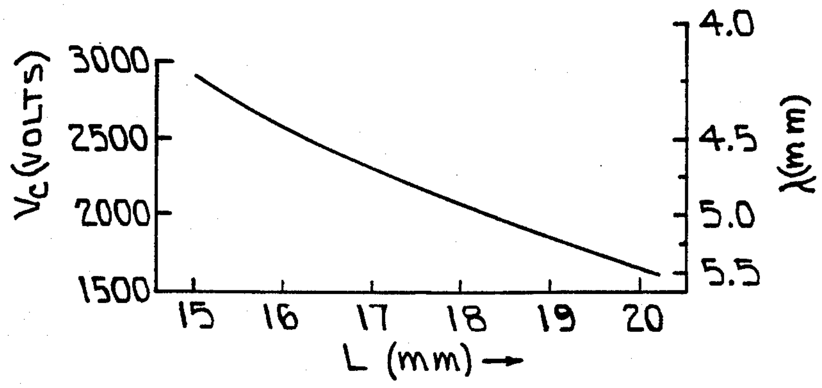
FIG. 4 is an orotron tuning curve, showing the mirror separation spacing and beam-accelerating voltage required for maximum output power over a selected frequency range.

If the mirror separation L is varied simultaneously as the grating-to-cathode voltage is varied, maximum power output of the orotron can be maintained over a very wide range of output frequencies, as illustrated by the tuning curve of FIG. 4 for the HDL 50-to-75 GHz orotron. As shown in FIG. 4, maximum power output of the orotron when oscillating in the $TEM_{207}$ mode can be maintained over a frequency range from 53.6 GHz ($\lambda$=5.6 mm) to 73.2 GHz ($\lambda$=4.1 mm) by varying the grid-to-cathode voltage from approximately 1700 volts to 2900 volts while simultaneously varying the mirror separation L from about 20 mm to 15 mm.

Thus, it is seen from FIG. 4 that any electromechanical positioning device for adjusting the mirror separation L in accordance with the grid-to-cathode voltage must be an extremely accurate device, with high resolution (minimal mechanical hysteresis). For this reason, in the preferred embodiment of the invention, the electromechanical positioning device 24 for adjusting the position of the upper mirror 16 to control the mirror separation L is a piezoelectric adjuster having inherent high resolution, such as the "Inchworm" translator manufactured by Burleigh Instruments, Inc, Fishers, N.Y. Present Burleigh "Inchworm" translators can raise or lower the upper mirror 16 at a rate of 2 millimeters per second with 20 nanometer resolution. For the HDL 50-to-75 GHz orotron, this corresponds to a change of 10 GHz per second with 1 KHz resolution capability.

Referring back to FIG. 1, the output voltage generated by the mirror positioner control voltage source 26 and the beam acceleration voltage generated by the cathode-to-grating voltage source 36 is simultaneously controlled by a control voltage adjuster 38, in accordance with a tuning curve for a selected oscillation mode of the resonator 12, such as that shown in FIG. 4 for the HDL 50-to-75 GHz orotron. In a simple embodiment of the invention the control voltage adjuster 38 can be a manual device calibrated in output frequency, in which the desired orotron output frequency is manually selected by an operator.

However, in the preferred embodiment of the invention, the control voltage adjustor 38 is automatically controlled by a feedback circuit in which the desired orotron output frequency is not only accurately selected, but also maintained during the operation of the orotron. This feedback circuit includes a frequency sensor 40, coupled to the orotron output line 22, which generates an output signal indicating the actual output frequency of the orotron. A frequency selector 42 generates an output signal corresponding to a desired orotron output frequency selected by an operator. The output signals of the frequency sensor 40 and the frequency selector 42 are supplied to a frequency comparator 44, which generates a frequency difference signal corresponding to the difference between the actual and desired orotron output frequencies. This frequency difference signal is supplied to the control voltage adjustor 38, which simultaneously adjusts the beam acceleration voltage and the mirror separation L to obtain maximum power output of the orotron at the desired output frequency.

Since there are many modifications, variations, and additions to the specific embodiment of the invention described herein which would be obvious to one's skill to the art, it is intended that the scope of the invention be limited only by the appended claims.

What is claimed and desired to be secured by Letters Patent of the United States is:

1. Apparatus for generating coherent near millimeter wavelength radiation, which comprises:

an open resonator formed by a first mirror and a second mirror which is spaced from the first mirror, the first mirror including a reflecting diffraction grating facing the second mirror, and the second mirror being movable relative to the first mirror to adjust the spacing between the two mirrors;

output coupling means for transmitting near millimeter wavelength radiation generated within the open resonator to an output line;

beam forming means, including a cathode, for generating a ribbon-like electron beam;

beam directing means for directing the electron beam across the diffraction grating;

beam velocity determining means for determining the electron beam velocity adjacent the diffraction grating, which comprises voltage generating means, having a positive output connected to the grating and a negative output connected to the cathode, for maintaining the cathode at a selected negative voltage relative to the grating; and frequency selection and tuning means for selecting a desired orotron output frequency within a wide frequency range and simultaneously tuning the orotron output power at the selected output frequency, comprising an electromechanical mirror positioning means, including a piezoelectric adjuster connected between the first and second mirrors, for determining the spacing between the two mirrors in accordance with a position signal supplied to the mirror positioning means, position signal generating means for generating the position signal, and signal adjusting means for simultaneously adjusting the grating-to-cathode voltage and the position signal.

2. Apparatus, as described in claim 1, wherein the signal adjusting means is controlled in accordance with a frequency difference signal supplied to the signal adjusting means and the frequency selection and tuning means further comprises:

frequency setting means for selecting the desired orotron output frequency;

frequency sensing means, coupled to the output line, for sensing the actual orotron output frequency; and frequency comparing means for comparing the selected desired orotron output frequency with the actual orotron output frequency and generating the frequency difference signal supplied to the signal adjusting means.

3. Apparatus for generating coherent near millimeter wavelength radiation, which comprises:

an open resonator formed by a first mirror and a second mirror which is spaced from the first mirror, the first mirror including a reflecting diffraction grating facing the second mirror, and the second mirror being movable relative to the first mirror to adjust the spacing between the two mirrors;

output coupling means for transmitting near millimeter wavelength radiation generated within the open resonator to an output line;

beam forming means, including a cathode, for generating a ribbon-like electron beam;

beam directing means for directing the electron beam across the diffraction grating;

beam velocity determining means for determining the electron beam velocity adjacent the diffraction grating, which comprises voltage generating means, having a positive output connected to the grating and a negative output connected to the cathode, for maintaining the cathode at a selected negative voltage relative to the grating; and frequency selection and tuning means for selecting a desired orotron output frequency within a wide frequency range and simultaneously tuning the orotron output power at the selected output frequency, comprising an electromechanical mirror positioning means, including a piezoelectric adjuster connected between the first and second mirrors, for determining the spacing between the two mirrors in accordance with a position signal supplied to the mirror positioning means, position signal generating means for generating the position signal, frequency setting means for selecting the desired output frequency, frequency sensing means, coupled to the output line, for sensing the actual orotron output frequency, frequency comparing means for comparing the selected desired orotron output frequency with the actual orotron output frequency and generating a frequency difference signal as a result of the comparison, and signal adjusting means, connected to receive the frequency difference signal, for simultaneously adjusting the grating-to-cathode voltage and the position signal in accordance with the frequency difference signal.

* * * * *